United States Patent [19]

Kain

[11] Patent Number: 4,469,737
[45] Date of Patent: Sep. 4, 1984

[54] PROCESS FOR LAMINATING MIRROR WITH PROTECTIVE BACKING AND PRODUCT RESULTING THEREFROM

[75] Inventor: Don S. Kain, Los Angeles County, Calif.

[73] Assignee: Monarch Mirror Door Co., Inc., Chatsworth, Calif.

[21] Appl. No.: 429,549

[22] Filed: Sep. 30, 1982

[51] Int. Cl.³ .................. B32B 17/10; B32B 27/34
[52] U.S. Cl. ............................. 428/198; 156/285; 156/290; 428/247; 428/255; 428/433; 428/447
[58] Field of Search ............ 428/247, 447, 255, 433, 428/912.2, 198; 156/285, 290

[56] References Cited

U.S. PATENT DOCUMENTS 1,563,018  11/1925  Colbert .............................. 428/912.2
4,328,276  5/1982  Swarovski ......................... 428/912.2

Primary Examiner—Marion McCamish
Attorney, Agent, or Firm—Allan M. Shapiro

[57] ABSTRACT

A protective backing is laminated onto the back of a mirror to inhibit scattering of broken glass pieces should the mirror be broken. The process comprises layering an open-weave scrim on the back of the mirror, with a paper coated with adhesive layered onto the scrim to adhesively attach the scrim and paper onto the back of the mirror. The article produced has the paper adhesively attached both to the scrim and the mirror.

15 Claims, 5 Drawing Figures

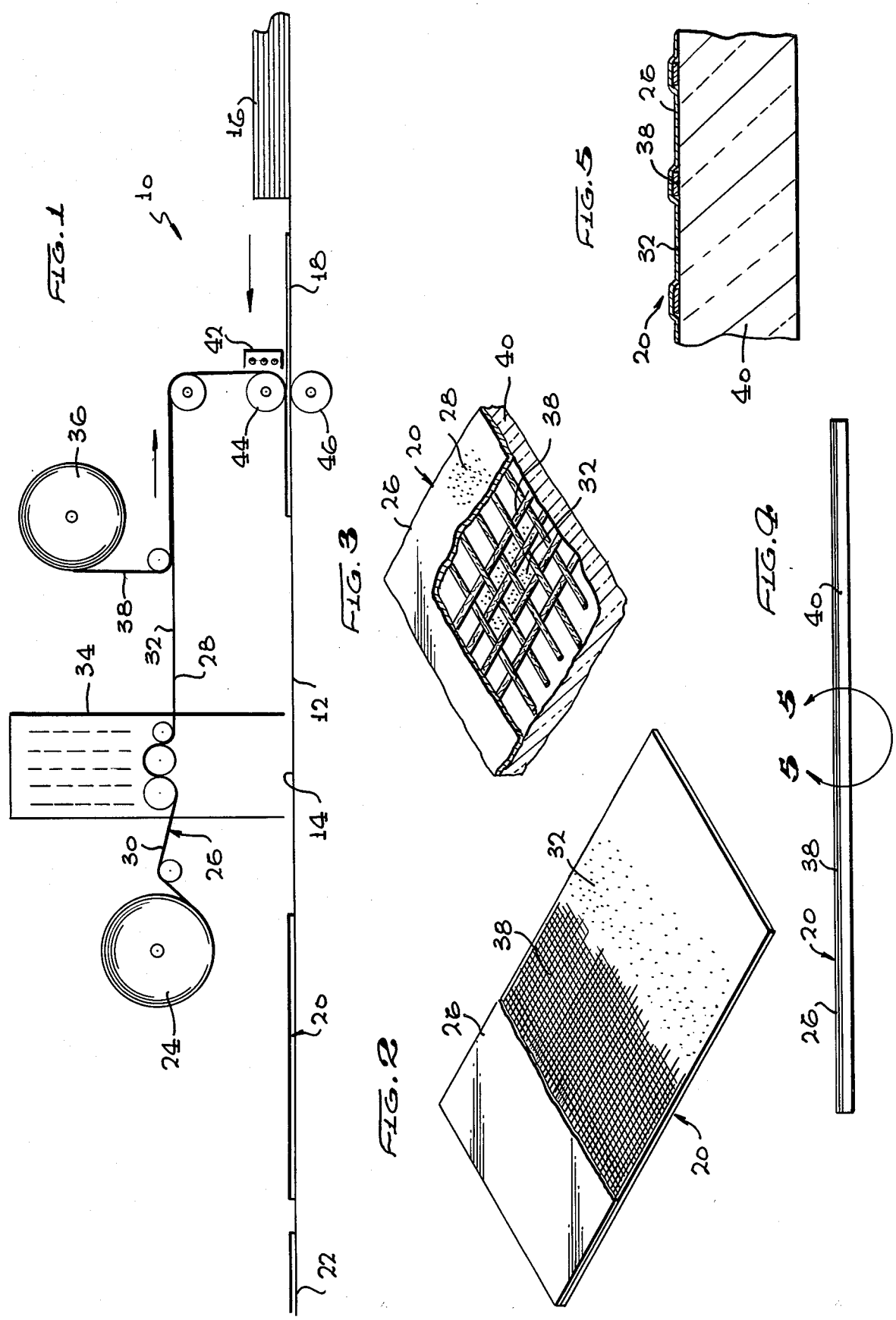

PROCESS FOR LAMINATING MIRROR WITH PROTECTIVE BACKING AND PRODUCT RESULTING THEREFROM

BACKGROUND OF THE INVENTION

This invention is directed to the lamination of a protective backing on a mirror, with secure attachment of the backing to the mirror, and to the mirror with that backing secured thereto.

The glass normally used in the manufacture of mirrors is subject to shattering when struck with an excess of force. In such shattering, a great number of glass pieces of different shapes and sizes fall nearby, with the distribution dependent upon the manner in which the breaking force is applied, and other factors.

When transparency is required, as in ordinary glass windows, not much can be done to restrain the pieces when the glass is broken. Nearly any attachment of sufficient strength to restrain the glass pieces when a window may be broken will adversely affect the transparency of the window. Therefore, except for very special situations, little is done with glass windows to control the shards when a window is broken. However, since mirrors do not require the transmission of light therethrough, it is possible to place a backing thereon which does not interfere with the mirror properties, but will restrain the distribution of glass shards should the mirror be broken. The process for attaching a suitable restraining layer to the back of a mirror is the purpose of this invention.

SUMMARY OF THE INVENTION

In order to aid in the understanding of this invention, it can be stated in essentially summary form that it is directed to a process for laminating upon a mirror a protective backing to control the shards of glass should the mirror be broken. This invention is also directed to the product resulting from the process.

The process comprises the steps of coating the face of a paper layer with an adhesive and applying this face against the back of the mirror with an open scrim of strong, flexible fibers therebetween so that the paper is adhesively attached both to the scrim and to the back of the mirror. This retaining structure thus has the strength in the scrim and the attachment by the paper to properly restrain broken glass shards.

It is, thus, an object of this invention to provide a process by which a structure can be laminated to the back of a mirror to restrain the broken glass shards upon the breaking of the mirror. It is another object to provide a process by which both a scrim and a layer of paper are adhesively attached to the back of the mirror so that they cooperate to restrain shards upon mirror breakage. It is a further object to provide a process whereby adhesive coating over the entire face of a paper layer attaches both the paper and the scrim to the back of a mirror. It is a further object to provide a process for attaching a protective backing such that it can be installed on a mirror production line so that the backing is attached as a part of the mirror production sequence.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a schematic side-elevational view of the arrangement of process equipment by which the process for laminating a protective backing onto the back of a mirror is accomplished.

FIG. 2 is an isometric view of the back of a mirror, with the several layers partially broken away.

FIG. 3 is an isometric view on larger scale than FIG. 2 of the mirror with the backing thereon, with parts of the mirror and parts of the paper layer being broken away.

FIG. 4 is a side-elevational view of a mirror with the protective backing laminated thereon.

FIG. 5 is an enlarged section through a portion of the mirror, taken generally along the line 5—5 of FIG. 4.

DESCRIPTION OF THE PREFERRED EMBODIMENT

FIG. 1 illustrates a group of process equipment 10 with which the process for laminating a protective backing on the back of a mirror is accomplished. The process equipment 10 includes conveyor 12 by which mirrors are sequentially advanced through the process steps. Conveyor 12 may be of any convenient type suitable for handling mirrors. For example, it may be a conveyor formed of rubber-faced rollers or wheels which support and advance the mirrors. Conveyor 12 has a top plane 14 on which the mirrors are supported. Most of the remainder of the conveyor 12 is purely schematic. The conveyor is suitably powered so that the mirror is moved through the process equipment in the desired manner.

Mirrors are sequentially fed along conveyor 12. A stack of mirrors 16 is illustrated as the source of mirrors. Individual mirrors are fed from the stack 16 onto the conveyor for advance. Mirror 18 is at the active process station. Mirrors 20 and 22 have passed from the source through the active station and are on their way to the next mirror step, which may be utilization. It is the completed mirror 20 which is illustrated in more detail in FIGS. 2 through 5.

While the source of mirrors is indicated as being a stack 16, the mirrors on conveyor 12 may be received directly from other mirror production machinery so that they are delivered through the active station of the processing equipment 10 as part of the continuous mirror processing steps.

Two principal layers are adhered together on the back of the mirror. Paper supply roll 24 supplies paper web 26. Paper web 26 has a back 28 which is ultimately the back of the completed assembly. The back surface 28 preferably carries thereon a layer of silicone to inhibit sticking to other surfaces. The face 30 of paper web 26 is uncoated paper stock. The face 30 is coated with an adhesive layer by coater 34. Coater 34 has suitable structure therein for applying adhesive layer 32. Adhesive layer 32 is preferably a layer of hot melted adhesive and, accordingly, coater 34 contains equipment for heating and applying thermoplastic adhesive so as to form layer 32 on the face 30 of paper web 26.

The paper web 26 is not sufficiently strong to restrain shards of glass should the mirror be broken. Scrim supply roll 36 supplies scrim web 38 for lamination between paper web 26 and the reflectorized glass layer 40 which forms the mirror. Scrim web 38 is preferably formed of an open web of thermoplastic synthetic polymer composition fibers which are thermoplastically bonded at their intersections by hot rolling. The scrim may be a fabric of loosely woven, loosely knitted fibers, or formed of unwoven fibers.

In the preferred embodiment, scrim web 38 is loosely woven, as is shown in FIG. 3. After the weaving process, the woven fabric is passed between hot rolls to both flatten the fabric and provide bonding at the intersection of strands. In the preferred embodiment indicated, scrim web 38 is laid on the adhesive layered face of paper web 26. After laying the two webs together and just before application to the mirror, the assembly is heated as by radiant heater 42.

The assembly is laminated onto the back of mirror 18 by laying it onto the back of mirror 18 and passing the assembly through pinch rolls 44 and 46. There is sufficient adhesive material in adhesive coating layer 32 to completely cover the backs of both the scrim web and the mirror. This coating is assured by the action of the pinch rolls 44 and 46 where the adhesive, in effect, is squeegeed at the pinch of the rolls to completely coat the scrim and the mirror. In addition, the pinching action presses the scrim and the paper closely against the back of the mirror so that the paper at the openings in the scrim is adhesively attached to the back of the mirror. This is shown in FIGS. 2 and 3, where the adhesive is shown as distributed across the entire mirror backing, and in FIG. 5, where it is illustrated as extending over the scrim 38 as well as under the paper layer 26.

By the employment of a thermoplastic adhesive and proper temperature control, the adhesive quickly sets at the pinch rolls 44 and 46 due to the thermal mass provided by the mirror 18. In this way, the paper web 26 is firmly attached to the back of the scrim layer 38 and to the back of the mirror where the scrim is open. The employment of a thermoplastic adhesive is desirable because of the adhesive attachment which is achieved promptly upon the squeezing and squeegeeing action of the pinch rolls.

The resultant product has secure attachment of the scrim because the paper secures the scrim in place. This secure attachment thus securely restrains and retains attachment to shards of glass when the mirror is broken. The scrim provides the flexibility together with continuing strength when the glass is broken, and the adhesive attachment of the paper to the scrim and to the glass provides control of the glass shards. In this way, the glass shards are controlled to inhibit spreading of the parts when the mirror is shattered.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A process for laminating a
protective backing onto a mirror comprising a flat layer of glass panel having reflective coating on the back thereof to form a mirror panel with a back, comprising the steps of:
providing a web of paper having a face;
coating the face of the paper web with a thermoplastic adhesive;
supplying an open, flexible scrim fabric layer;
applying the scrim to the back of the mirror panel;
applying the face of the paper web to the scrim web;
heating the thermoplastic adhesive sufficiently warm to be plastic; and
in a single step applying pressure to force both the scrim web and paper web at the same time into adhesive attachment with the back of the glass panel.

2. The process for laminating of claim 1 wherein
preliminarily to the supplying of the paper web, the back of the paper web opposite its face is silicone coated to minimize sticking against the back of the paper web.

3. The process for laminating of claim 1 wherein the step of attaching is accomplished by pinch rolls which engage the entire laminated stack of thermoplastic adhesive coated paper web, open fabric scrim layer and mirror panel to progressively squeeze the webs against the mirror panel and advance the webs and mirror panel to spread the plastic adhesive and roll the paper web and scrim web into simultaneous adhesive attachment with the mirror panel.

4. The process for laminating of claim 3 wherein
the open scrim fabric web is laid against the thermoplastic coated face of the paper web before the application of pressure to the laminated stack by the pinch rolls.

5. The article produced by the process of claim 1.

6. A process for laminating a
protective backing onto a mirror comprising a flat layer of glass panel having reflective coating on the back thereof to form a mirror panel with a back, comprising the steps of:
providing a web of paper having a face;
coating the face of the paper web with a thermoplastic adhesive;
supplying an open, flexible scrim fabric layer;
applying heat to the thermoplastic adhesive immediately before applying laminating pressure;
laying the open scrim fabric web against the thermoplastic coated face of the paper web;
applying pinch rolls to engage the entire laminated stack of thermoplastic adhesive coated paper web, open fabric scrim layer and mirror panel to progessively squeeze the webs against the mirror panel and advance the webs and mirror panel to spread the plastic adhesive and roll the paper web and scrim web into simultaneous adhesive attachment with the mirror panel.

7. The process for laminating of claim 6 wherein
the pinch rolls lie adjacent the plane of a conveyor table along which the mirror panels are advanced so that the laminating process is part of a mirror manufacturing system.

8. The process for laminating of claim 7 wherein
preliminarily to the supplying of the paper web, the back of the paper web opposite its face is silicone coated to minimize sticking against the back of the paper web.

9. The process for laminating of claim 6 which
includes the preliminary step of placing a metallized mirror layer on the back of the glass panel and the protective backing comprised of the scrim fabric and paper layer are adhesively attached to the metallized mirror backing of the glass panel.

10. The process for laminating of claim 6 wherein
said scrim fabric is made of thermoplastic fibers and including hot-rolling to flatten the open scrim fabric and thermoplastically join said fibers at their crossing points.

11. The article produced by the process of claim 6.

12. A laminted article comprising:
a mirror comprised principally of a glass panel having a metallized mirror surface on the back thereof;
laminae adhesively attached to the back of the mirror panel, said laminae comprising an open scrim fabric adhesively attached to the back of said mirror panel and a paper web adhesively attached to the back of said scrim fabric and to the back of said mirror panel through the openings in said scrim fabric, said adhesive attachment of said scrim fabric and said paper layer being made the same by thermoplastic adhesive.

13. The laminated article of claim 12 wherein
said paper web has a face and a back with said face being attached to said scrim layer and said mirror back by said thermoplastic adhesive, said back of said paper web being coated with a silicone layer to render the back of said paper web non-sticky.

14. The laminated article of claim 12 wherein
said scrim web layer and said paper web layer extend to the peripheral edges of said mirror panel.

15. The laminated article of claim 13 wherein
said scrim fabric is made of thermoplastic fibers and said fibers are thermoplastically joined at their crossing points by hot-rolling to flatten the open scrim fabric.

* * * * *